(12) United States Patent
Maeno

(10) Patent No.: US 10,027,162 B2
(45) Date of Patent: Jul. 17, 2018

(54) SOLAR BATTERY CONTROLLER

(71) Applicant: TOYOTA JIDOSHA KABUSHIKI KAISHA, Toyota-shi (JP)

(72) Inventor: Seigen Maeno, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 69 days.

(21) Appl. No.: 15/030,470

(22) PCT Filed: Oct. 21, 2014

(86) PCT No.: PCT/IB2014/002165
§ 371 (c)(1),
(2) Date: Apr. 19, 2016

(87) PCT Pub. No.: WO2015/059540
PCT Pub. Date: Apr. 30, 2015

(65) Prior Publication Data
US 2016/0261141 A1  Sep. 8, 2016

(30) Foreign Application Priority Data
Oct. 22, 2013 (JP) ................. 2013-219573

(51) Int. Cl.
*H02J 7/00* (2006.01)
*H02J 7/35* (2006.01)
*B60L 8/00* (2006.01)
*G05F 1/67* (2006.01)
*H02J 3/38* (2006.01)

(52) U.S. Cl.
CPC ............... *H02J 7/35* (2013.01); *B60L 8/003* (2013.01); *G05F 1/67* (2013.01); *H02J 3/385* (2013.01); *B60L 2240/12* (2013.01); *B60L 2240/36* (2013.01); *Y02T 10/7083* (2013.01)

(58) Field of Classification Search
CPC ...................................................... H01M 10/44
USPC ............................................................ 320/101
See application file for complete search history.

(56) References Cited

U.S. PATENT DOCUMENTS

| | | | | |
|---|---|---|---|---|
| 4,314,198 A | * | 2/1982 | Rogers .................... | H02J 7/35 136/291 |
| 5,414,306 A | * | 5/1995 | Kanno .................... | H02H 7/00 307/130 |

(Continued)

FOREIGN PATENT DOCUMENTS

| | | |
|---|---|---|
| JP | 61-281316 A | 12/1986 |
| JP | 2014-157396 A | 8/2014 |

OTHER PUBLICATIONS

Navid Haghdadi, An Analytic Approach for Estimation of Maximum Power point in Solar cars, ICEE2012, pp. 575-579.*

(Continued)

*Primary Examiner* — Yalkew Fantu
(74) *Attorney, Agent, or Firm* — Oblon, McClelland, Maier & Neustadt, L.L.P.

(57) ABSTRACT

A solar battery controller is provided which includes a solar battery module that is mounted on a moving object, a control unit that calculates a maximum power point of the solar battery module, and a speed detecting unit that detects a speed of the moving object. The control unit controls a maximum power point calculating timing depending on the speed of the moving object.

10 Claims, 11 Drawing Sheets

(56) References Cited

U.S. PATENT DOCUMENTS

| | | | | |
|---|---|---|---|---|
| 5,569,998 A | * | 10/1996 | Cowan | H02J 7/35 |
| | | | | 136/291 |
| 2008/0084179 A1 | * | 4/2008 | Emori | H02J 7/0016 |
| | | | | 320/109 |
| 2008/0100258 A1 | * | 5/2008 | Ward | H01M 10/465 |
| | | | | 320/101 |
| 2009/0001926 A1 | * | 1/2009 | Sato | B60L 3/0046 |
| | | | | 320/102 |
| 2013/0314006 A1 | * | 11/2013 | Lan | B60L 8/003 |
| | | | | 318/139 |

OTHER PUBLICATIONS

N. Haghdadi, et al., "An Analytic Approach for Estimation of Maximum Power Point in Solar Cars," 20th Iranian Conference on Electrical Engineering (ICEE), 2012, 6 pages.
International Search Report dated Feb. 9, 2015 in PCT/IB14/02165 Filed Oct. 21, 2014.

* cited by examiner

SOLAR BATTERY CONTROLLER

BACKGROUND OF THE INVENTION

1. Field of the Invention

The present invention relates to a solar battery controller.

2. Description of Related Art

A technique of calculating a maximum power point in solar battery arrays in total by connecting the solar battery arrays, which are connected in series to each other, to monitoring solar batteries corresponding to the number of solar battery arrays in parallel and detecting short-circuit currents of the monitoring solar batteries and open-circuit voltages of the solar battery arrays is known (for example, Japanese Patent Application Publication No. 61-281316 (JP 61-281316 A)).

However, in the technique described in JP 61-281316 A, the timing of detecting the short-circuit currents of the monitoring solar batteries and the open-circuit voltages of the solar battery arrays is not described. Accordingly, when a solar battery module is mounted on a moving object, the maximum power point calculating timing cannot be appropriately set and thus there is a possibility that an increase in computational load or a delay in the maximum power point calculating timing will occur.

SUMMARY OF THE INVENTION

Therefore, an aspect of the invention provides a solar battery controller that can appropriately set a maximum power point calculating timing even when a solar battery module is mounted on a moving object.

According to an aspect of the invention, there is provided a solar battery controller including: a solar battery module that is mounted on a moving object; a control unit that calculates a maximum power point of the solar battery module; and a speed detecting unit that detects a speed of the moving object, wherein the control unit controls a maximum power point calculating timing depending on the speed of the moving object.

According to the aspect, it is possible to provide a solar battery controller that can appropriately set a maximum power point calculating timing even when a solar battery module is mounted on a moving object.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
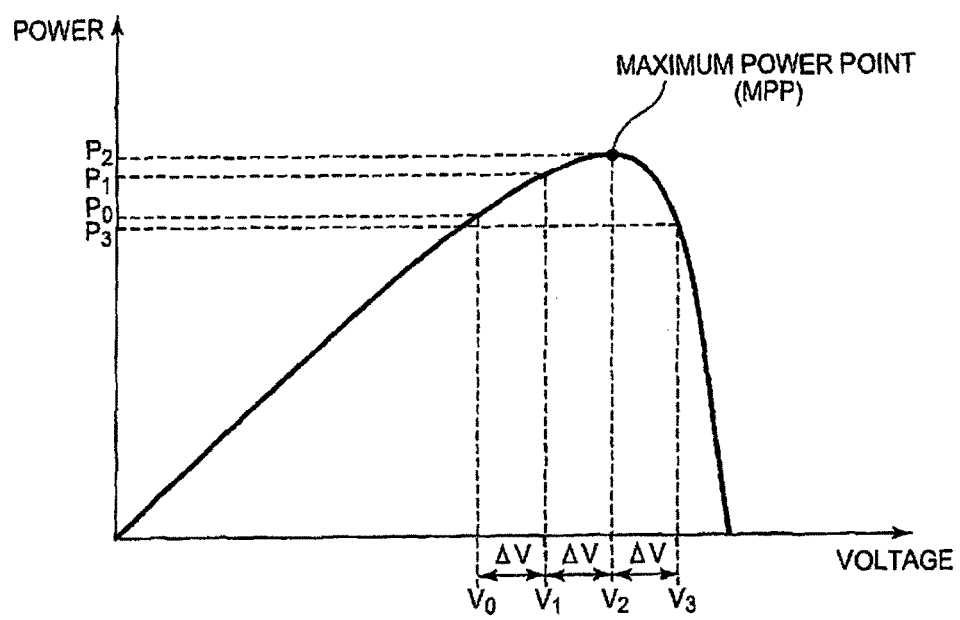
FIG. 1 is a diagram illustrating a PV characteristic curve of a solar battery.

Hereinafter, embodiments of the invention will be described with reference to the accompanying drawings. In this specification and in the drawings, elements having substantially the same functional configurations will be referenced by the same reference signs and description thereof will not be repeated.

Figure 2:
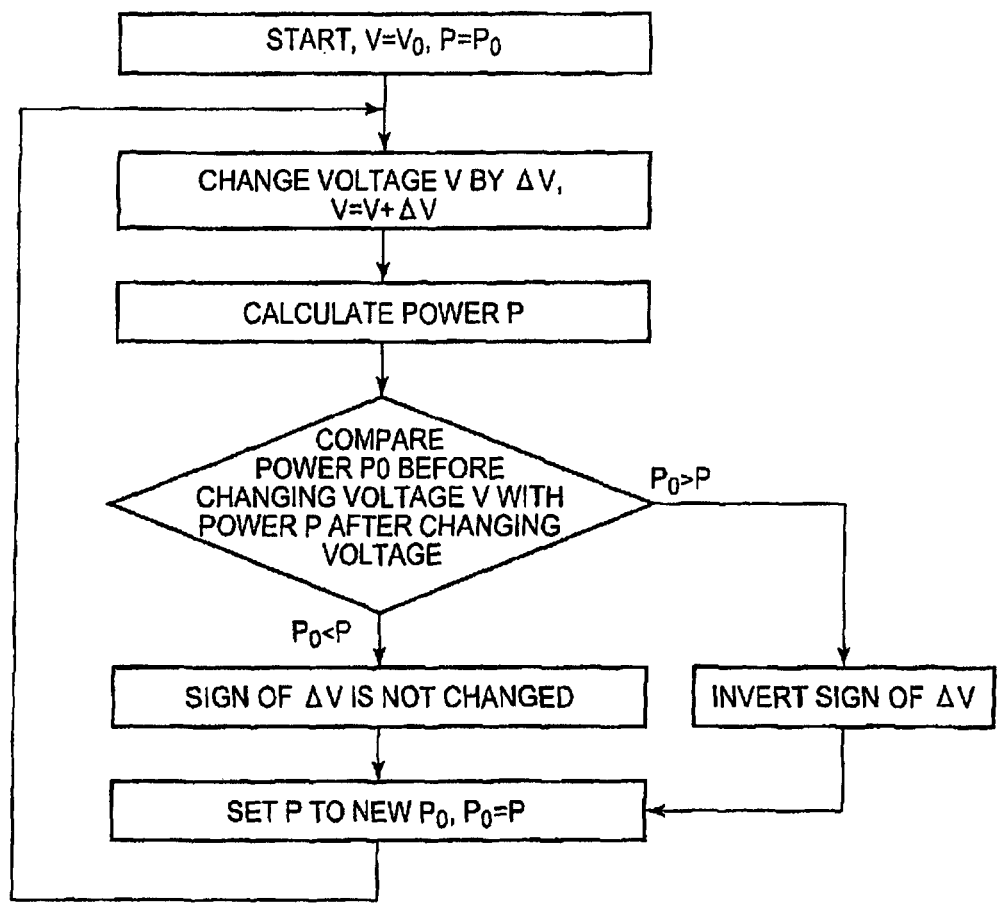
FIG. 2 is a flowchart illustrating the logic of a hill-climbing method.

FIG. 1 is a diagram illustrating a PV characteristic curve describing a relationship between an operating voltage V and a power P of a solar battery. FIG. 2 is a flowchart illustrating the logic of a hill-climbing method.

The power P of a solar battery varies with the operating voltage V and the PV characteristic curve has a maximum point as illustrated in FIG. 1. The maximum point of the PV characteristic curve in FIG. 1 is a maximum power point (MPP) at which the power P is a maximum. MPP power $P_m$ is calculated by multiplying a maximum-power operating voltage $V_{Pm}$ which is the operating voltage at the MPP by a maximum-power operating current $I_{Pm}$ which is the operating current at the MPP.

Since the PV characteristic curve varies on the basis of variations in an amount of solar radiation and a temperature, therefore the maximum-power operating voltage $V_{Pm}$ and the maximum-power operating current $I_{Pm}$ also vary on the basis of the variation.

In order to use the power P of a solar battery maximally, the solar battery only needs to be operated at the MPP. However, since the MPP normally varies depending on the amount of solar radiation or the temperature, it is necessary to perform maximum power point tracking (MPPT) control of tracking the MPP. In the MPPT control, as illustrated in the flowchart of FIG. 2, the power P of a solar battery is measured at predetermined time intervals Δt and the operating voltage V is controlled so as to increase the power P.

A hill-climbing method will be described below as an example of the MPPT control with reference to FIGS. 1 and 2.

In the PV characteristic curve illustrated in FIG. 1, it is assumed that the operating voltage V at a time point at which control using the hill-climbing method is started is set to $V=V_0$, and the power P at the time point at which control using the hill-climbing method is started is set to $P=P_0$.

First, the operating voltage V is increased by $\Delta V$ to be $V_1(=V_0+\Delta V)$ and $P_1$ is calculated.

$P_0$ and $P_1$ are compared, the sign of $\Delta V$ is not changed because $P_1$ is greater than $P_0$, the operating voltage V is increased by $\Delta V$ to be $V_2(=V_1+\Delta V)$, and $P_2$ is calculated.

$P_1$ and $P_2$ are compared, the sign of $\Delta V$ is not changed because $P_2$ is greater than $P_1$, the operating voltage V is increased by $\Delta V$ to be $V_3(=V_2+\Delta V)$, and $P_3$ is calculated.

At this time, $P_2$ and $P_3$ are compared, the sign of $\Delta V$ is inverted because $P_3$ is less than $P_2$, the operating voltage V is decreased by $\Delta V$ to be $V_2(=V_3-\Delta V)$, and $P_2$ is calculated.

Then; until the PV characteristic curve varies due to the variations of the amount of solar radiation and the temperature, the operating voltage V varies between $V_1$ and $V_3$ while the sign of $\Delta V$ is inverted whenever the operating voltage V reaches $V_1$ and $V_3$.

As described above, it is possible to track the MPP of a solar battery by controlling the operating voltage V at predetermined time intervals $\Delta t$. This series of operations is embodied, for example, by changing the duty ratio of a voltage converter disposed in an inverter.

However, in the MPPT control, since the power P is measured and computation is carried out at the predetermined time intervals $\Delta t$ by the use of an analog circuit, the time required for calculating the MPP is several seconds. When a part of the solar battery is shaded, the voltage at the MPP greatly varies in comparison with before the part of the solar battery is shaded, and thus the time requiring for calculating the MPP may be further extended or the MPP may not be calculated.

In the MPPT control, the operating voltage V constantly varies at the predetermined time intervals $\Delta t$ and the power P constantly varies with the variation thereof. Particularly, in the vicinity of the MPP, since the power P constantly decreases on the basis of the variation of the operating voltage V, the decrease serves as power loss.

Since the magnitude of the variation $\Delta V$ of the operating voltage V is always constant regardless of the magnitude of the operating voltage V, the variation of the power P due to the variation of $\Delta V$ is great in the vicinity of the MPP. Accordingly, the power loss in the vicinity of the MPP becomes great and the power loss serves as a factor for decreasing utilization efficiency of the solar battery.

When $\Delta V$ decreases, the time from the start timing of the inverter to the arrival timing at the MPP is extended and thus the utilization efficiency of the solar battery decreases in the meantime. In the MPPT control, the operating voltage V constantly varies and the variation of the operating voltage V serves as a factor for disturbing the control stability of the inverter. Accordingly, in order to maintain the control stability of the inverter, the predetermined interval time $\Delta t$ at which the operating voltage V is controlled, that is, the response speed of the MPPT control, cannot be set to be too great.

When a solar battery module is installed for residential use or for mega solar use, the variation in the amount of solar radiation ranges from several seconds to several minutes and thus the MPP of the solar battery module tracks the variation in the amount of solar radiation by using the MPPT control based on the hill-climbing method.

However, when a solar battery module is mounted on a moving object, the variation in the amount of solar radiation, for example, an influence of shade or an influence of an uneven surface on which the moving object travels, may be equal to or less than several ms. Accordingly, when a solar battery module is mounted on a moving object, it is difficult to make the MPP of the solar battery module track the variation in the amount of solar radiation by using the MPPT control based on the hill-climbing method.

Figure 3:
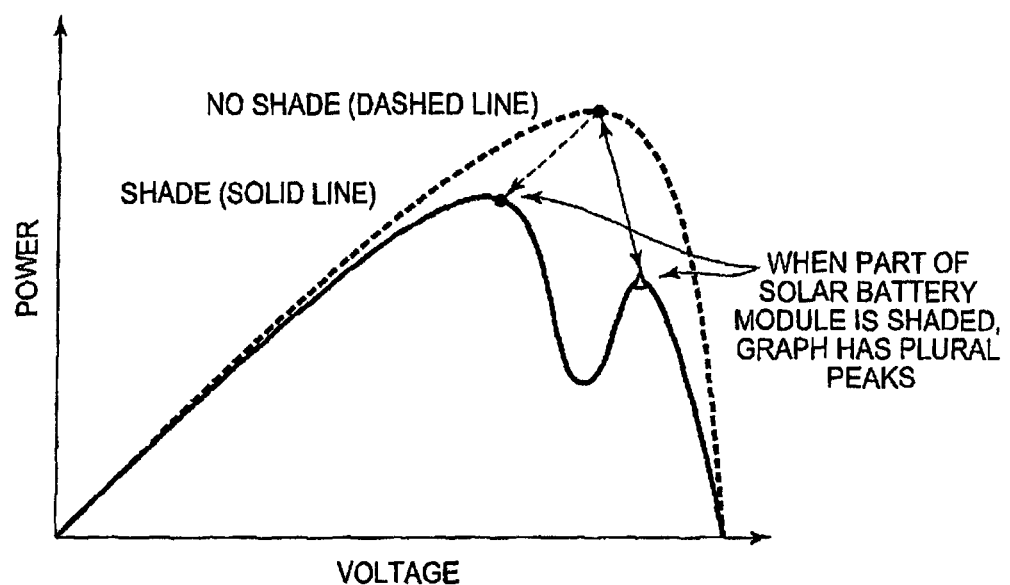
FIG. 3 is a diagram illustrating an example of the PV characteristic curve when a part of a solar battery is shaded.

When the solar battery module is partially shaded and two maximum points appears in the PV characteristic curve as illustrated in FIG. 3, the operating point of the solar battery module may not reach the MPP.

Therefore, embodiments to be described below propose a solar battery controller 1 that can appropriately set the MPP calculating timing even when a solar battery module is mounted on a moving object.

First Embodiment

Configuration of Solar Battery Controller

First, the configuration of a solar battery controller 1 according to a first embodiment of the invention will be described below with reference to FIG. 4.

Figure 4:
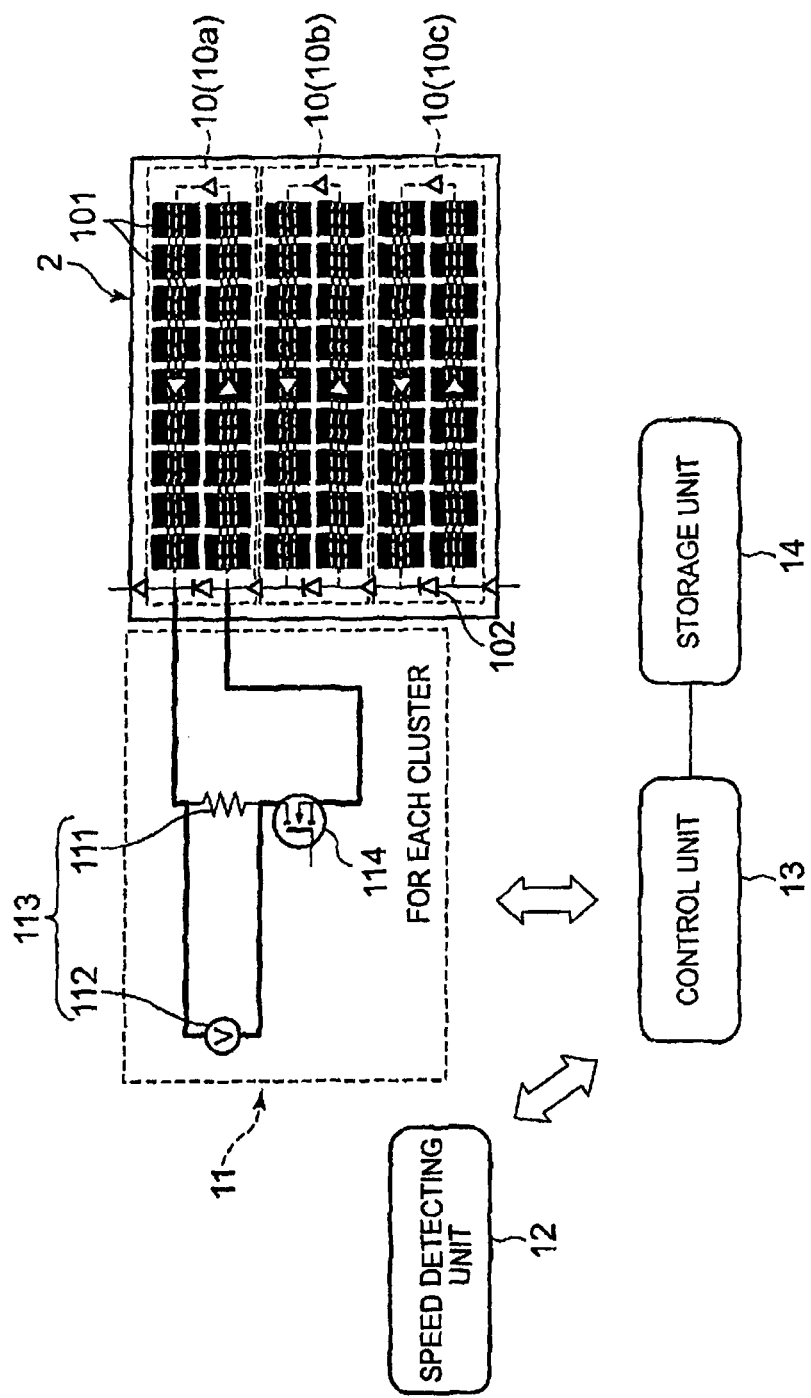
FIG. 4 is a diagram schematically illustrating a solar battery controller according to a first embodiment of the invention.

As illustrated in FIG. 4, the solar battery controller 1 according to the first embodiment includes a solar battery cluster 10, a light intensity detecting unit 11, a speed detecting unit 12, a temperature detecting unit (not illustrated), a control unit 13, and a storage unit 14.

The solar battery cluster 10 has a configuration in which plural solar battery cells 101 are electrically connected in series to each other. A bypass diode 102 is connected to the solar battery cluster 10, the bypass diode 102 and the solar battery cells 101 being connected in parallel, the solar battery cells 101 being connected in series to each other. Plural solar battery clusters 10 are connected in series to constitute a solar battery module 2, which is mounted on a moving object.

The bypass diode 102 is an element for bypassing a part of a main circuit so as to prevent a decrease in power of the solar battery module 2 as a whole, generation of heat, or burnout caused by partial shade or trouble in the solar battery clusters 10. The solar battery module 2 is connected to a voltage converter (not illustrated) and supplies power to a load or the like.

The light intensity detecting unit 11 is connected in parallel to the solar battery clusters 10 and includes a current detecting unit 113 having a shunt resistor 111 and a voltmeter 112 and a switching element 114. The light intensity detecting unit 11 can measure a short-circuit current of the solar battery cluster 10 through the use of the current detecting unit 113 and calculate a variation of the light intensity applied to the solar battery cluster 10, by turning on the switching element 114.

The ON and OFF states of the switching element 114 are controlled by the control unit 13 to be described later.

The speed detecting unit 12 detects the speed of a moving object and is not particularly limited. For example, a speedometer that detects a speed on the basis of an angular velocity of the vehicle wheels of the moving object or a speedometer that detects a speed using a signal acquired by a GPS can be used.

The temperature detecting unit detects the temperature of the solar battery cells 101 and is not particularly limited. For example, a thermocouple can be used.

The control unit 13 is constituted, for example, by a microcomputer and calculates the MPP of the solar battery cluster 10 on the basis of the variation in the light intensity detected by the light intensity detecting unit 11 and the temperature $T_{cell}$ of the solar battery cells 101 detected by the temperature detecting unit. The control unit 13 controls the MPP calculating timing depending on the speed of the moving object detected by the speed detecting unit 12.

The storage unit 14 stores the variation in the light intensity detected by the light intensity detecting unit 11 and the computed values calculated by the control unit 13. The storage unit 14 stores open-circuit voltages $V_{oc}$ of the solar battery cells 101 as a function of the temperature $T_{cell}$ of the solar better cells in advance. The storage unit 14 can be embodied by a RAM or a ROM, for example, using a semiconductor memory, a magnetic disk, or an optical disc.

The operation of the control unit 13 will be described below in detail.

MPP Calculating Method

An MPP calculating method in the control unit 13 will be described first with reference to FIGS. 5 to 12.

Figure 5:
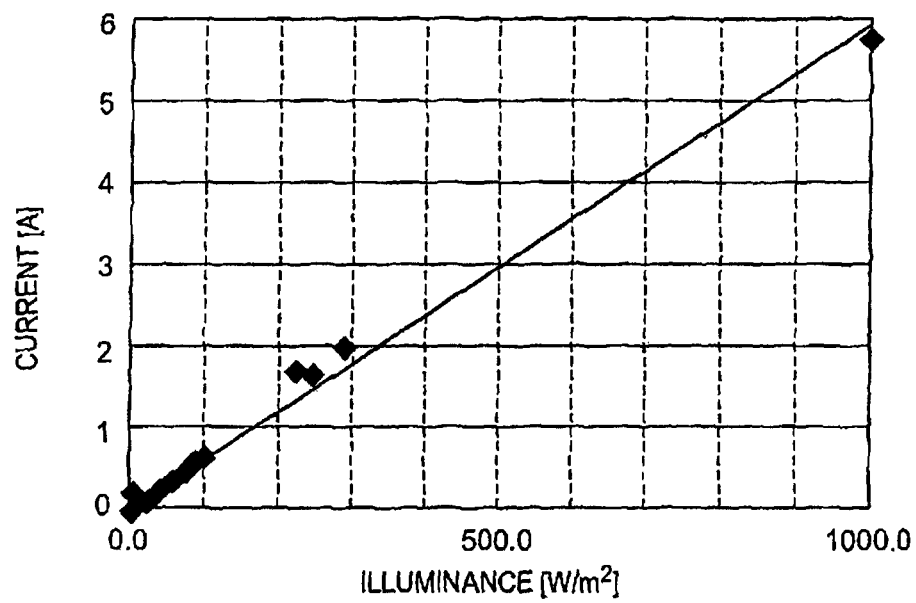
FIG. 5 is a diagram illustrating an example of a relationship between illuminance applied to a solar battery and a short-circuit current.
Figure 6:
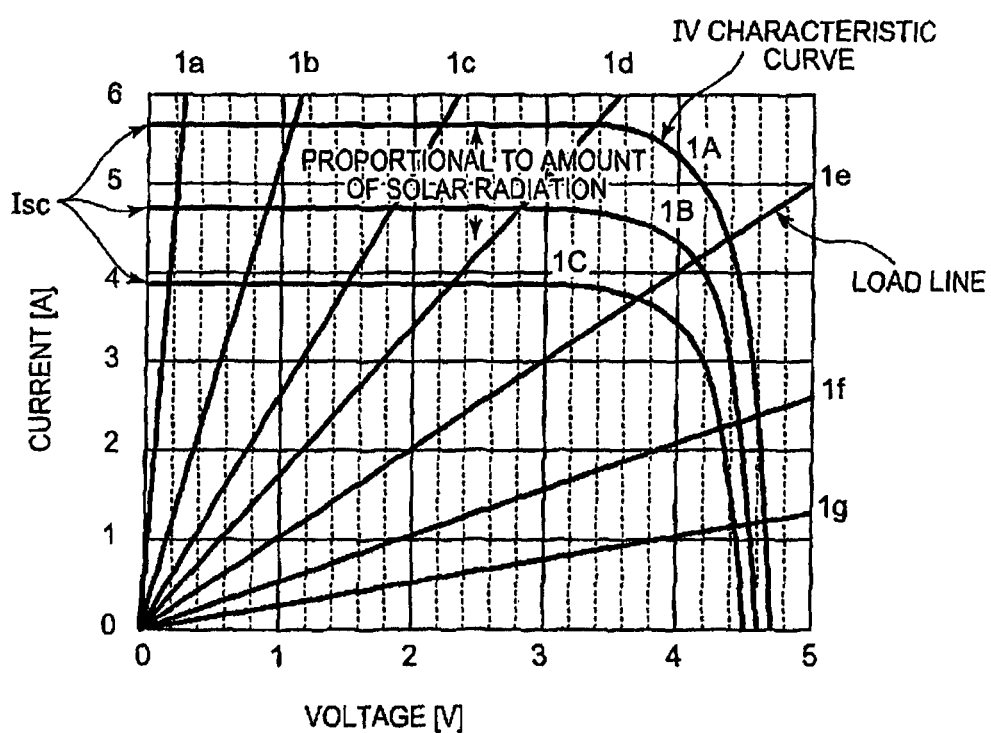
FIG. 6 is a diagram illustrating an example of an IV characteristic curve of a solar battery and a load line.

FIG. 5 is a diagram illustrating an example of a relationship between illuminance applied to a solar battery and a short-circuit current. FIG. 6 is a diagram illustrating an example of an IV characteristic curve of a solar battery and a load line. Reference signs 1A to 1C in FIG. 6 represent IV characteristic curves of a solar battery when an amount of solar radiation varies and reference signs 1a to 1g represent load lines when a load connected in parallel to the solar battery varies.

As illustrated in FIG. 5, a short-circuit current $I_{sc}$ of a solar battery is proportional to light intensity (an amount of solar radiation or illuminance) applied to the solar battery. As illustrated in, FIG. 6, the short-circuit current $I_{sc}$ increases as indicated by the IV characteristic curve 1A when the amount of solar radiation is large, and the short-circuit current $I_{sc}$ decreases as indicated by the IV characteristic curve 1C when the amount of solar radiation is small.

The slope of the load line varies by causing the shunt resistor 111 connected to the solar battery to vary. For example, the slope increases as indicated by the load line 1a when the resistance value of the shunt resistor 111 is small, and the slope decreases as indicated by the load line 1g when the resistance value of the shunt resistor 111 is large.

When the IV characteristic curve of a solar battery is denoted by 1A and the shunt resistor 111 is selected so as to obtain the load lines 1a to 1d, the current values at the intersections of the IV characteristic curve 1A and the load lines 1a to 1d are almost equal to each other. Even when the IV characteristic curve is changed to 1A to 1C, the current values are thought to be similar to IV characteristic curve 1A.

That is, by selecting the shunt resistor 111 so as to obtain the load lines 1a to 1d, it is possible to approximately estimate the short-circuit current $I_{sc}$ of the solar battery even when the amount of solar radiation varies.

In order to reduce power loss due to generation of heat from the shunt resistor 111 or the like, it is preferable that the resistance value of the shunt resistor 111 be as small as possible. When the shunt resistor 111 with a small resistance value is selected, it may be affected by system noise or the like. Accordingly, one skilled in the art can appropriately select the shunt resistor 111 depending on a system in use.

The open-circuit voltages $V_{oc}$ of a solar battery is determined depending on the type of the solar battery, the illuminance applied to the solar battery, and the temperature $T_{cell}$ of the solar battery.

Figure 7:
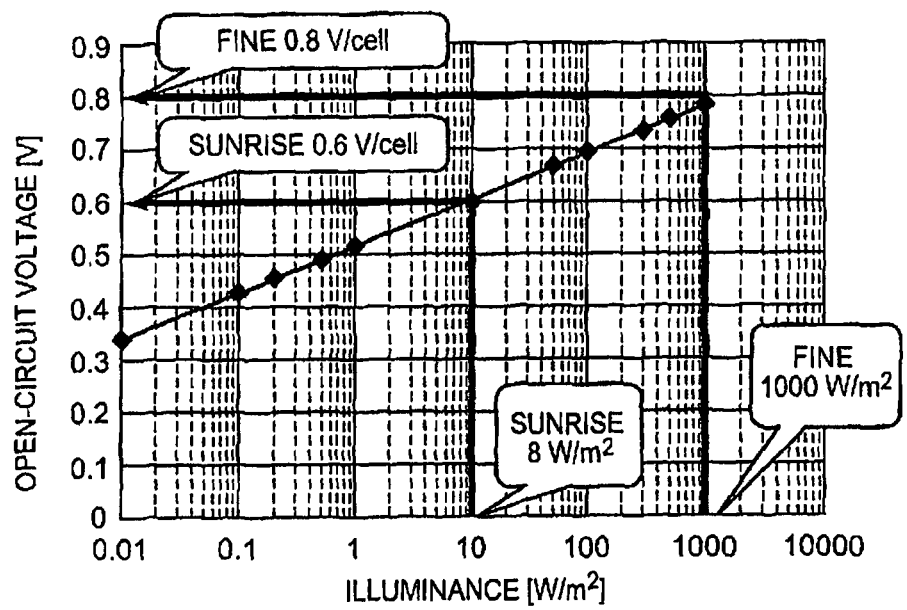
FIG. 7 is a diagram illustrating an example of a relationship between illuminance applied to a solar battery and an open-circuit voltage.
Figure 8:
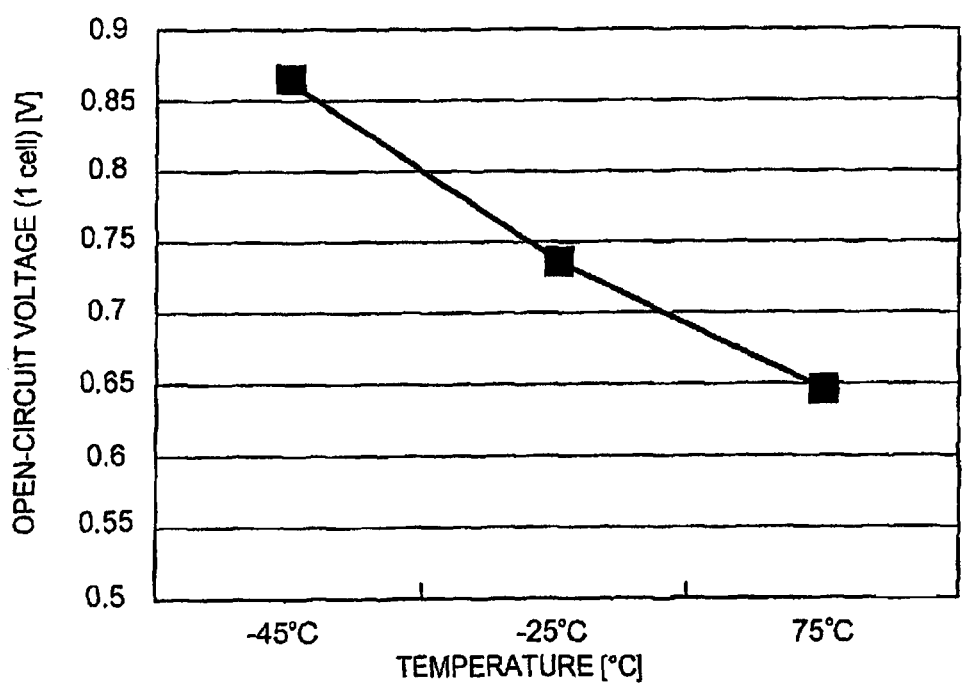
FIG. 8 is a diagram illustrating an example of a relationship between a temperature of a solar battery and an open-circuit voltage.

FIG. 7 is a diagram illustrating an example of a relationship between the illuminance applied to a solar battery and the open-circuit voltages $V_{oc}$. FIG. 8 is a diagram illustrating an example of a relationship between the temperature $T_{cell}$ of a solar battery and the open-circuit voltages $V_{oc}$.

As illustrated in FIG. 7, the larger the illuminance applied to the solar battery becomes, the higher the open-circuit voltages $V_{oc}$ of the solar battery becomes. For example, the open-circuit voltages $V_{oc}$ of the solar battery is 0.8 V per single solar battery cell when the illuminance applied to the solar battery is 1000 W/m² (in the fine weather), and is 0.6 V per single solar battery cell when the illuminance applied to the solar battery is 8 W/m² (at the sunrise).

As illustrated in FIG. 8, the higher the temperature $T_{cell}$ of the solar battery becomes, the lower the open-circuit voltages $V_{oc}$ of the solar battery becomes. For example, the open-circuit voltages $V_{oc}$ of the solar battery is 0.65 V when the temperature $T_{cell}$ the solar battery is 75° C., and is 0.73 V when the temperature $T_{cell}$ of the solar battery is 25° C.

The characteristic diagrams illustrated in FIGS. 7 and 8 are examples where a silicon solar battery is used as the solar battery, and the relationships vary depending on the type of the solar battery in use. Accordingly, it is preferable that the relationship between the illuminance applied to the solar battery or the temperature $T_{cell}$ of the solar battery and the open-circuit voltages $V_{oc}$ be stored in the storage unit 14 in advance with reference to specifications of the solar battery depending on the type of the solar battery, by measurement using the solar battery, or the like.

The following relationship is set up between the short-circuit current $I_{sc}$ and the maximum-power operating current $I_{Pm}$ of the solar battery: $I_{Pm}=k_1 \times I_{sc}$, $k_1$=const . . . . (X). The following relationship is set up between the open-circuit voltages $V_{oc}$ and the maximum-power operating voltage $V_{Pm}$ of the solar battery: $V_{Pm}=k_2 \times V_{oc}$, $k2$=const . . . . (Y). Here, $k_1$ and $k_2$ are constants and can be determined depending on the type of the solar battery.

Figure 9:
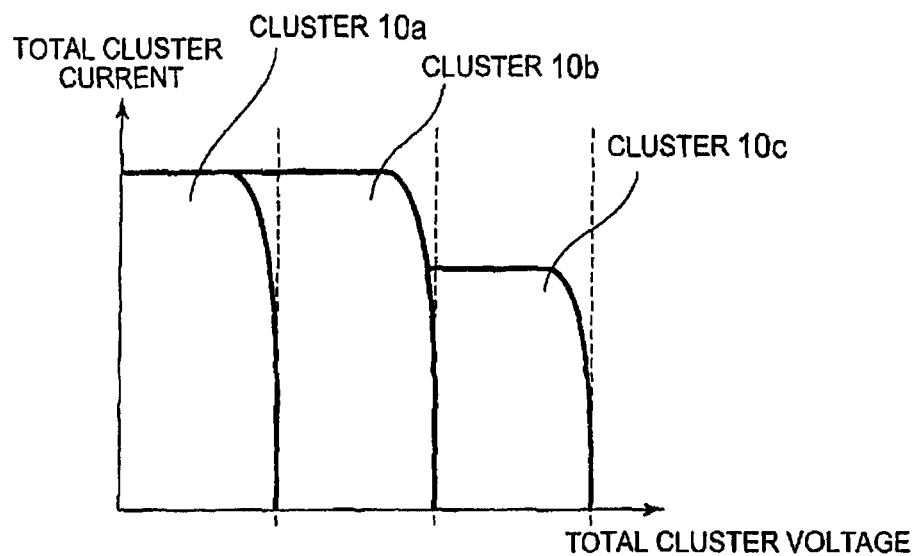
FIG. 9 is a diagram illustrating an example of the IV characteristic curve when a part of a solar battery cluster is shaded.

FIG. 9 is a diagram illustrating an example of the IV characteristic curve when parts of the three solar battery clusters 10a, 10b, and 10c connected in series are shaded. In FIG. 9, since parts of the solar battery cells 101 in the solar battery cluster 10c are shaded, the amount of solar radiation is small. As illustrated in FIG. 9, the difference in solar radiation condition between the solar battery clusters 10 can be determined on the basis of superposition of the IV characteristic curves of the solar battery clusters 10.

Figure 10:
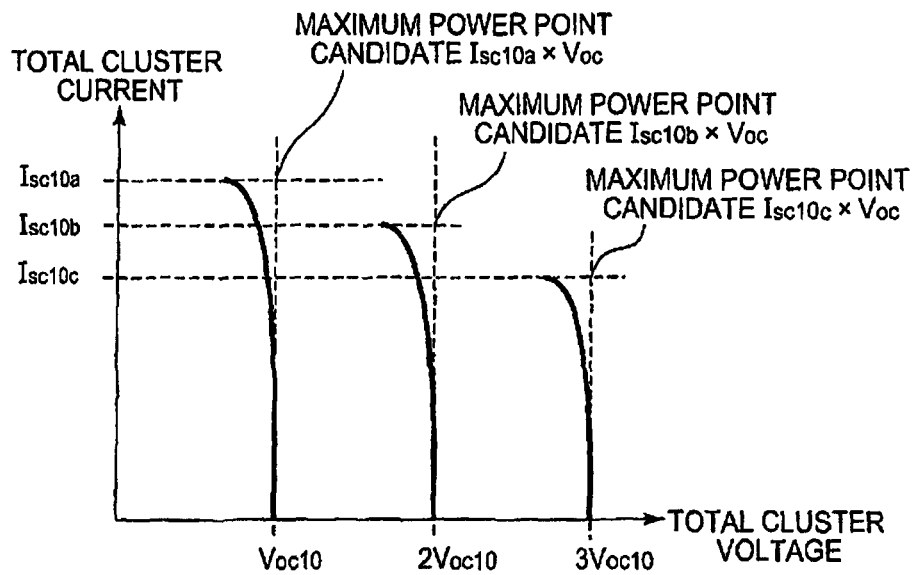
FIG. 10 is a diagram illustrating an IV characteristic curve used to describe a maximum power point calculating method according to the first embodiment.
Figure 11:
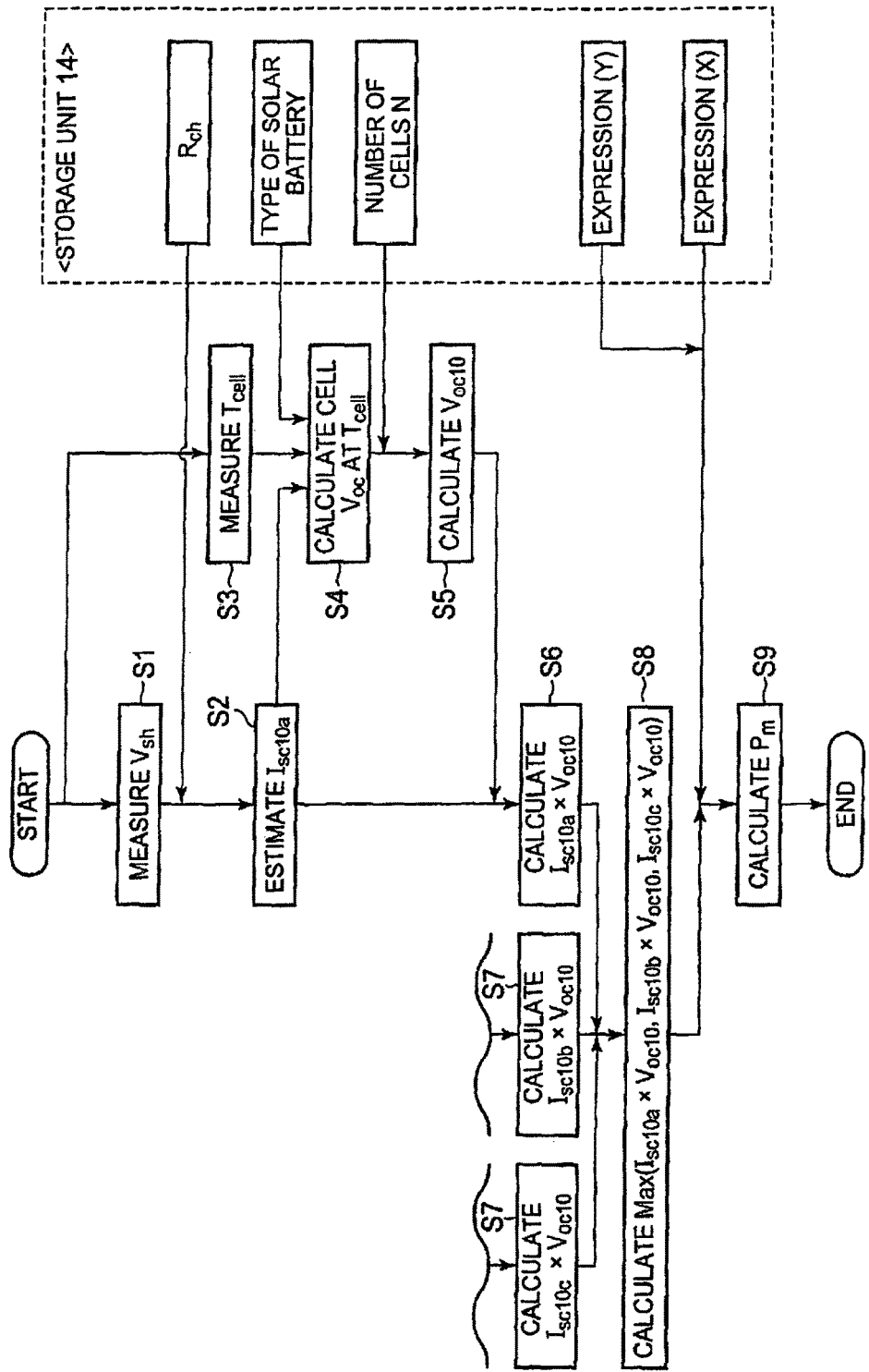
FIG. 11 is a flowchart illustrating an example of the maximum power point calculating method according to the first embodiment.

FIGS. 10 and 11 are an IV characteristic curve diagram and a flowchart illustrating an MPP calculating method according to the first embodiment, respectively. The MPP calculating method in the solar battery controller 1 according to the first embodiment will be specifically described below with reference to FIGS. 10 and 11.

As illustrated in FIG. 11, the control unit 13 calculates the MPP power $P_m$ of the solar battery module 2 through the following steps (S1) to (S9). (S1) The switching element 114 of the light intensity detecting unit 11 is turned on and a voltage $V_{sh}$ applied to the shunt resistor 111 is measured through the use of the voltmeter 112. (S2) The current flowing in the shunt resistor 111 is calculated on the basis of the voltage $V_{sh}$ and a shunt resistance value $R_{sh}$ stored in the storage unit 14 in advance, and the short-circuit current $I_{sc10a}$ of the solar battery cluster 10a is estimated. (S3) The temperature $T_{cell}$ of the solar battery cells 101 is measured through the use of the temperature detecting unit. (S4) The open-circuit voltage $V_{oc}$ of the solar battery cells 101 at the temperature $T_{cell}$ is calculated on the basis of the short-circuit current $I_{sc10a}$, the temperature $T_{cell}$, and the type of the solar battery stored in the storage unit 14 in advance. (S5) The open-circuit voltages $V_{oc10}$ of the solar battery cluster 10a is calculated by multiplying the number of solar battery cells 101 N, which are connected in series and constitute the solar battery cluster 10a, by the open-circuit voltages $V_{oc}$ of the solar battery cells 101. (S6) A maximum power point candidate $I_{sc10a} \times V_{oc10}$ in the solar battery cluster 10a is calculated by multiplying the short-circuit current $I_{sc10a}$ by the open-circuit voltages $V_{oc10}$. (S7) The maximum power point candidates $I_{sc10b} \times V_{oc10}$ and $I_{sc10c} \times V_{oc10}$ are calculated by performing the same processes as (S1) to (S6) on the solar battery clusters 10b, 10c. (S8) The values of the maximum power point candidates $I_{sc10a} \times V_{oc10}$, $I_{sc10b} \times V_{oc10}$, and $I_{sc10c} \times V_{oc10}$ in the three solar battery clusters 10a, 10b, and 10c are compared and the largest maximum power point candidate is calculated. (S9) $I_{Pm}$ and $V_{Pm}$ of the solar battery module 2 are calculated by applying Expressions (X) and (Y) stored in advance in the storage unit 14 to the largest maximum power point candidate and the MPP power $P_m$ of the solar battery module 2 is determined by multiplying $I_{Pm}$ and $V_{Pm}$.

In the solar battery controller 1 according to the first embodiment, it is possible to track the MPP of the solar battery by causing the control unit 13 to repeatedly perform the MPP calculating method at a predetermined calculation timing to be described later.

As described above, in the first embodiment, the maximum power point candidates are calculated for the respective solar battery clusters 10a, 10b, and 10c and the MPP power $P_m$ of the solar battery module 2 is calculated by applying Expressions (X) and (Y) to the largest maximum power point candidate. However, the MPP calculating method is only an example and the invention is not limited to this example.

Figure 12:
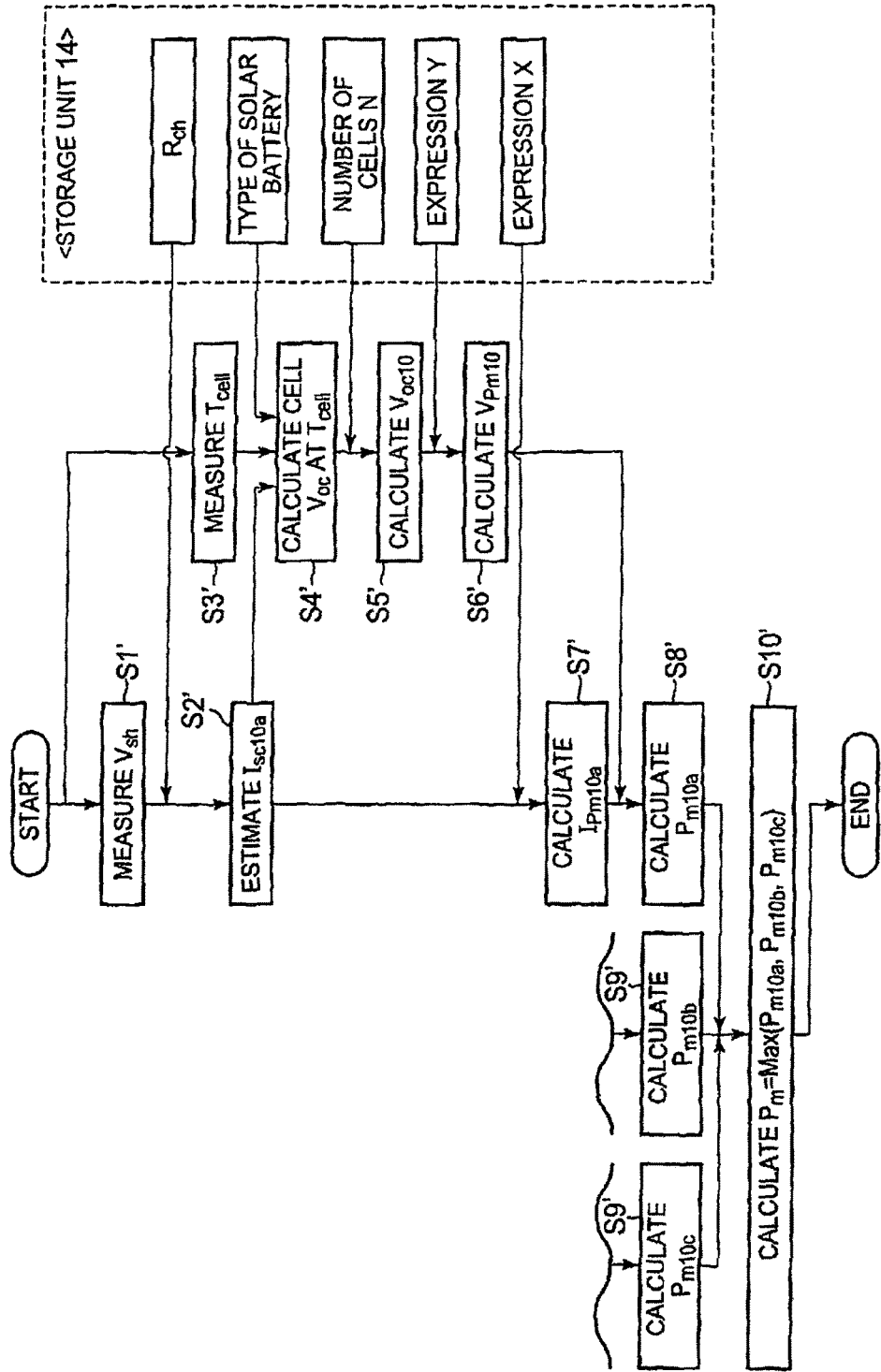
FIG. 12 is a flowchart illustrating another example of the maximum power point calculating method according to the first embodiment.

For example, as illustrated in FIG. 12, the control unit 13 may calculate the MPP power $P_m$ of the solar battery module 2 through the following steps (S1') to (S10'). (S1') The switching element 114 of the light intensity detecting unit 11 is turned on and a voltage $V_{sh}$ applied to the shunt resistor 111 is measured, through the use of the voltmeter 112. (S2') The current flowing in the shunt resistor 111 is calculated on the basis of the voltage $V_{sh}$ and a shunt resistance value $R_{sh}$ stored in the storage unit 14 in advance, and the short-circuit current $I_{sc10a}$ of the solar battery cluster 10a is estimated. (S3') The temperature $T_{cell}$ of the solar battery cells 101 is measured through the use of the temperature detecting unit. (S4') The open-circuit voltage $V_{oc}$ of the solar battery cells 101 at the temperature $T_{cell}$ is calculated on the basis of the short-circuit current $I_{sc10a}$, the temperature $T_{cell}$, and the type of the solar battery stored in the storage unit 14 in advance. (S5') The open-circuit voltages $V_{oc10}$ of the solar battery cluster 10a is calculated by multiplying the number of solar battery cells 101 N, which are connected in series and constitute the solar battery cluster 10a, by the open-circuit voltages $V_{oc}$ of the solar battery cells 101. (S6') The maximum-power operating voltage $V_{Pm10}$ in the solar battery cluster 10a is calculated by applying Expression (Y) stored in advance in the storage unit 14 to the open-circuit voltages $V_{od10}$. (S7') The maximum-power operating current $I_{Pm10a}$ is calculated by applying Expression (X) stored in advance in the storage unit 14 to the short-circuit current $I_{sc10a}$. (S8') The maximum power $P_{m10a}$ in the solar battery cluster 10a is calculated by multiplying the maximum-power operating current $I_{Pm10a}$ and the maximum-power operating voltage $V_{Pm10}$. (S9') The maximum power $P_{m10b}$ and $P_{m10c}$ is calculated by performing the same steps as (S1') to (S8') on the solar battery clusters 10b, 10c. (S10') The MPP power $P_m$ of the solar battery module 2 is determined by comparing the maximum power $P_{m10a}$, $P_{m10b}$, and $P_{m10c}$ and selecting the largest maximum power.

MPP Calculating Timing

The control of the MPP calculating timing in the control unit 13 will be described below.

Table 1 shows representative examples of the shade and the shade passage times by speeds of a moving object.

As illustrated in Table 1, examples of a shading object that shades the solar battery module 2 mounted on the moving object from the solar radiation include an electric cable, an utility pole support wire, a road sign, a utility pole, a pedestrian bridge, a usual tree, a large tree, a large truck, a house, a building, an expressway soundproof wall, and a tunnel. Each shading object has various sizes from a small size to a large size.

TABLE 1

| | Size [m] | (1) cell (125 mm) | (2) cluster (300 mm × 1000 mm) | (3) module (1000 mm) | Shade invasion speed and shade passage time (upper [km/h], lower [m/s]) | | | |
|---|---|---|---|---|---|---|---|---|
| | | | | | 40 11.1 | 80 22.2 | 120 33.3 | 160 44.4 |
| Electric cable | 0.01 | — | — | — | 0.0009 | 0.00045 | 0.0003 | 0.000225 |
| Utility pole support wire | 0.01 | — | — | — | 0.0009 | 0.00045 | 0.0003 | 0.000225 |
| Road sign | 0.1 | O | — | — | 0.009 | 0.0045 | 0.003 | 0.00225 |
| Utility pole | 0.3 | O | O | — | 0.027 | 0.0135 | 0.009 | 0.00675 |
| Pedestrian bridge | 3 | O | O | O | 0.27 | 0.135 | 0.09 | 0.0675 |
| Usual tree | 4 | O | O | O | 0.36 | 0.18 | 0.12 | 0.09 |
| Large tree | 10 | O | O | O | 0.9 | 0.45 | 0.3 | 0.225 |
| Large truck | 10 | O | O | O | 0.9 | 0.45 | 0.3 | 0.225 |
| house | 15 | O | O | O | 1.35 | 0.675 | 0.45 | 0.3375 |
| building | 50 | O | O | O | 4.5 | 2.25 | 1.5 | 1.125 |
| Expressway soundproof wall | — | O | O | O | — | — | — | — |
| tunnel | — | O | O | O | — | — | — | — |

"—": almost not affected by the shade
"O": affected by the shade

For example, when the shading object is an electric cable or the utility pole support wire, the size thereof is 0.01 m which is small and thus the output characteristics of the solar battery cells 101, the solar battery clusters 10, and the solar battery module 2 are not almost affected by the shade of the shading object (which is indicated by "-" in Table 1).

On the other hand, when the shading object is a pedestrian bridge, the size is 3 m which is large and thus the output characteristics of the solar battery cells 101, the solar battery clusters 10, and the solar battery module 2 are affected by the shade of the shading object (which is indicated by "O" in Table 1).

The time in which the solar battery module 2 is shaded from the solar radiation is 0.135 s, for example, when the moving object traveling at 80 km/h passes the pedestrian bridge (with a size of 3 m). That is, since the solar battery module 2 mounted on the moving object is shaded by the pedestrian bridge for 0.135 s, the MPP of the solar battery module 2 is different from the MPP before being shaded.

Therefore, by shifting the operating point of the solar battery module 2 through the MPPT control, the solar battery module 2 operates at the MPP. However, in the MPPT control using the hill-climbing method or the like, since the power P is measured and the computation is carried out at predetermined time intervals Δt through the use of an analog circuit, it is difficult to cause the solar battery module 2 to track the MPP in the order of milliseconds.

On the other hand, since the solar battery controller 1 according to the first embodiment has a configuration in which the switching element 114 is controlled and the short-circuit current $I_{sc}$ is detected for each solar battery cluster 10, it is possible to cause the solar battery module 2 to track the MPP even in the order of milliseconds.

Figure 13:
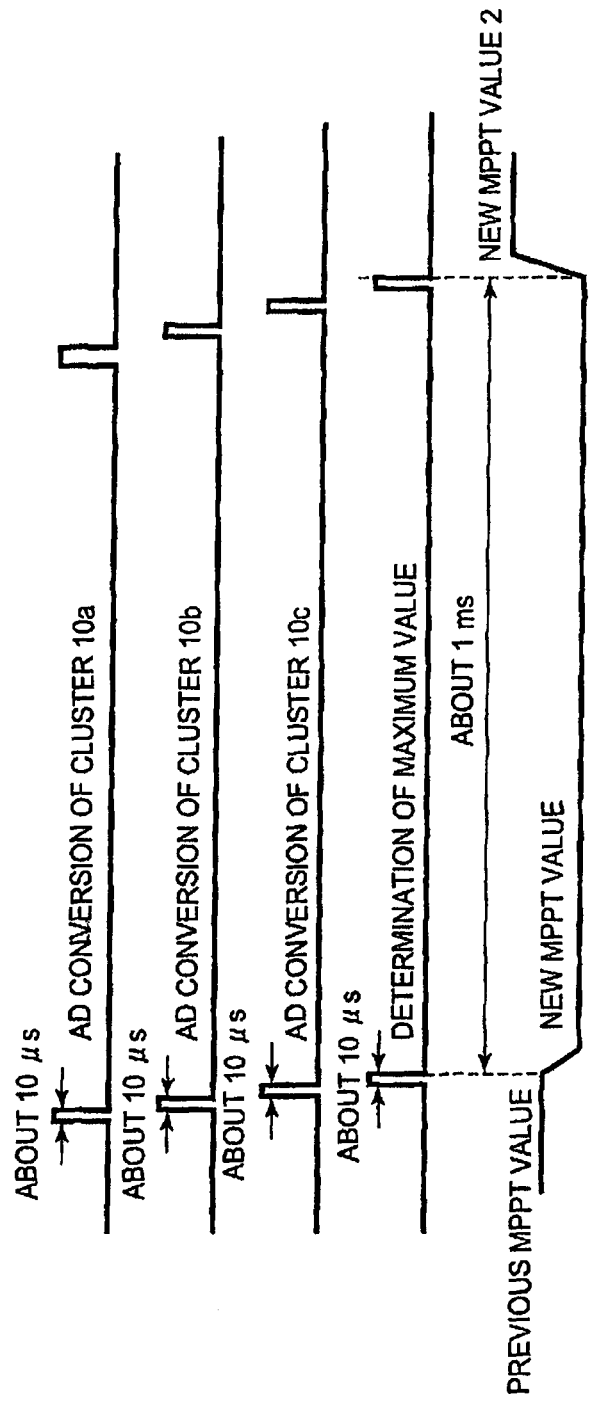
FIG. 13 is a diagram illustrating a maximum power point calculating timing according to the first embodiment.

For example, as illustrated in FIG. 13, when a microcomputer (of which one state is 40 ns) with a clock frequency of 25 MHz is used, the time required for AD conversion in one solar battery cluster 10 is about 10 μs. The time required for comparing the power $P_m$ calculated for the respective clusters to determine the maximum value is about 10 μs. The time required for causing the operating point before calculating the MPP to converge on the newly-calculated MPP is about 1 ms.

The MPP calculating timing does not need to be a constant time and can be determined in consideration of the shade passage time shown in Table 1 depending on the speed of the moving object. That is, the MPP calculating timing can be advanced when the speed of the moving object is high, and the MPP calculating timing can be postponed when the speed of the moving object is low.

For example, when a moving object traveling at 80 km/h passes through a pedestrian bridge (with a size of 3 m), the shade passage time is 0.135 s as shown in Table L and thus the MPP calculating timing can be set to be equal to or less than 0.135 s.

For example, when the speed of a moving object is 80 km/h and the ON/OFF cycle of the switching element 114 is set to 1 ms (0.001 s), the MPP of the solar battery module 2 tracks all the shading objects other than the electric cable and the utility pole support wire, as shown in Table 1.

When the moving object stops (0 km/h), the switching element 114 can be set to the OFF state while the moving object is stopping. Accordingly, it is possible to reduce switching loss due to generation of heat in the switching element 114.

As described above, the solar battery controller 1 according to the first embodiment can appropriately set the MPP calculating timing without increasing the computational load even when the solar battery module 2 is mounted on a moving object.

Second Embodiment

A configuration of a solar battery controller 1 according to a second embodiment of the invention will be described below with reference to FIG. 14.

The solar battery controller 1 according to the second embodiment is different from the solar battery controller 1 according to the first embodiment, in that a solar radiation sensing element is used as the light intensity detecting unit 11. Accordingly, the solar battery controller 1 according to the second embodiment will be described below with a focus on the light intensity detecting unit 11.

Figure 14:
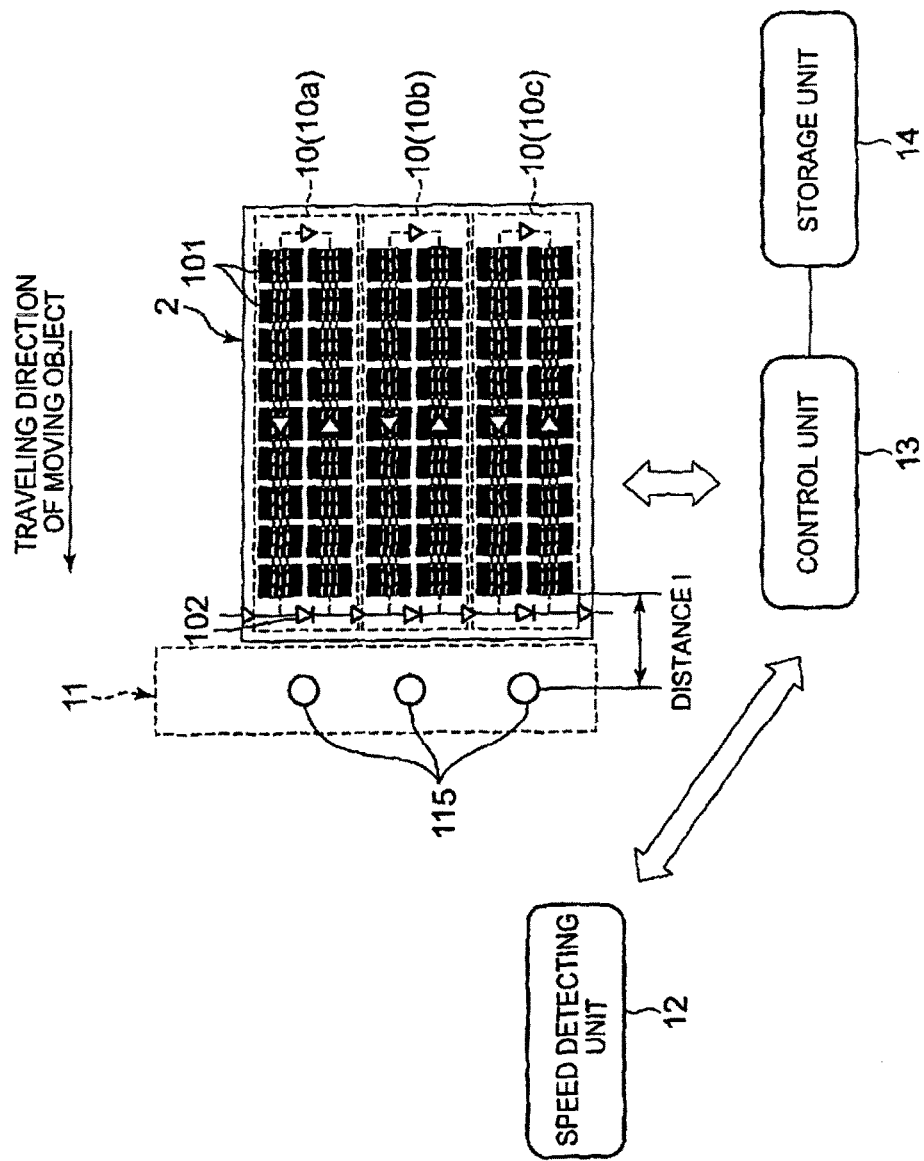
FIG. 14 is a diagram schematically illustrating a solar battery controller according to a second embodiment of the invention.

As illustrated in FIG. 14, the solar battery controller 1 according to the second embodiment includes a solar radiation sensing element (for example, photodiode 115) that detects an amount of solar radiation as the light intensity detecting unit 11.

The photodiode 115 is disposed for each solar battery cluster 10 so as to be separated by a predetermined distance 1 on the front side in the traveling direction of the moving object with respect to the solar battery cluster 10 and detects a variation in the light intensity applied to the solar battery module 2.

The control unit 13 controls the operating voltage V of the solar battery cluster 10 on the basis of a predetermined offset time $t_{offset}$ based on the speed of the moving object on the basis of the variation in the light intensity detected by the photodiode 115.

The distance 1 at which the photodiode 115 is installed can be set using the value considered as the speed v of the moving object and the processing time t required for computation.

For example, when the speed v of the moving object is set to 0 km/h to 200 km/h and the processing time t required for computation in the control unit 13 is set to 10 μs, the following expression is established: $0 \le (l/t) \le 55.5$ [m/s], t=10 [μs], which is $0 \le l \le 55.5 \times 10^{-5}$ [m]. That is, when the processing time t required for computation is 10 μs and the speed of the moving object ranges from 0 km/h to 200 km/h, the distance 1 between the solar battery cluster 10 and the photodiode 115 only needs to be equal to or greater than $55.5 \times 10^{-5}$ m, which is sufficiently smaller than the size of the moving object.

The offset time $t_{offset}$ can be set as follows, for example, when the speed of the moving object is 100 km/h (22.2 m/s) and the distance 1 is 10 cm (0.1 m): $t_{offset}=0.1$ [m]/22.2 [m/s]=4.5 [ms]. As described above, the solar battery controller 1 according to the second embodiment can appropriately set the MPP calculating timing without increasing the computational load even when the solar battery module 2 is mounted on a moving object.

Particularly, according to the second embodiment, since the light intensity detecting unit 11 is not provided with the switching element 114, the switching loss due to generation of heat is not caused and the power consumption of the light intensity detecting unit 11 is reduced.

While the solar battery controller 1 has been described with reference to the embodiments, the invention is not limited to the embodiments but can be modified and improved in various forms without departing from the scope of the invention.

For example, the embodiments of the invention has employed the configuration in which the light intensity detecting unit 11 includes the shunt resistor 111 and the switching element 114 or the configuration in which the photodiode 115 is used as the light intensity detecting unit 11, but the invention is not limited to this configuration. The light intensity detecting unit 11 only needs to have a configuration capable of detecting a variation in light intensity, and for example, a solar battery cell can be used as the light intensity detecting unit 11.

When a solar battery cell is used as the light intensity detecting unit 11, it is preferable that the solar battery cell be a solar battery cell having the same specification as the solar battery cells constituting the solar battery, module 2 mounted on the moving object.

A single solar battery module 2 in which three solar battery clusters 10 are connected in series has been used as the solar battery module 2 mounted on the moving object, but the number of solar battery clusters 10 is not limited to three. In addition, for example, plural solar battery modules 2 may be connected.

The invention claimed is:

1. An apparatus comprising:
   a plurality of solar battery clusters mounted on a moving object;
   a control unit that calculates a maximum power point of the plurality of solar battery clusters;
   a speed detecting unit that detects a speed of the moving object;
   a plurality of light intensity detecting units that detect a variation of light intensity applied to the plurality of solar battery clusters, each of the plurality of solar battery clusters being provided with a light intensity detecting unit,
   wherein the control unit:
   controls a timing of the calculating the maximum power point depending on the speed of the moving object including advancing the timing of the calculating the maximum power point when the speed of the moving object is high and postponing the timing of the calculating the maximum power point when the speed of the moving object is low, and
   calculates the maximum power point on the basis of the variation of the light intensity.

2. The apparatus according to claim 1, wherein
   the light intensity detecting unit includes a current detecting unit and a switching element, and
   the variation of the light intensity is calculated on the basis of a current detected by the current detecting unit.

3. The apparatus according to claim 1, wherein the light intensity detecting unit includes a solar radiation sensing element that detects an amount of solar radiation applied to a solar battery cluster.

4. The apparatus according to claim 3, wherein
   the solar radiation sensing element is disposed on the front side in a traveling direction of the moving object, and
   the solar radiation sensing element is separated by a predetermined distance from the solar battery module.

5. The apparatus according to claim 1, wherein
   bypass diodes are connected to the plurality of solar battery clusters,
   the bypass diodes and solar battery cells are connected in parallel, and
   the solar battery cells are connected in series.

6. An apparatus comprising:
   a plurality of solar battery clusters mounted on a moving object;
   a processor configured to calculate a maximum power point of the plurality of solar battery clusters;
   a speed detector configured to detect a speed of the moving object;
   a plurality of light intensity detectors configured to detect a variation of light intensity applied to the plurality of solar battery clusters, each of the plurality of solar battery clusters being provided with a light intensity detector,
   wherein the processor is configured to:
   control a timing of the calculating the maximum power point depending on the speed of the moving object including advancing the timing of the calculating the maximum power point when the speed of the moving object is high and postponing the timing of the calculating the maximum power point when the speed of the moving object is low, and
   calculate the maximum power point on the basis of the variation of the light intensity.

7. The apparatus according to claim 6,
   wherein the light intensity detector includes a current detector and a switch, and
   wherein the variation of the light intensity is calculated on the basis of a current detected by the current detector.

8. The apparatus according to claim 6, wherein the light intensity detector includes a solar radiation sensor that detects an amount of solar radiation applied to a solar battery cluster.

9. The apparatus according to claim 8, wherein
   the solar radiation sensor is disposed on the front side in a traveling direction of the moving object, and
   the solar radiation sensor is separated by a predetermined distance from the plurality of solar battery clusters.

10. The apparatus according to claim 6, wherein
    bypass diodes are connected to the plurality of solar battery clusters,
    the bypass diodes and solar battery cells are connected in parallel, and
    the solar battery cells are connected in series.

* * * * *